Aug. 29, 1961 R. G. FRIEDMAN 2,997,725
TONG FEED FORGING MACHINE WITH SUPPLEMENTAL
WORK SUPPORT AND TRANSFER MEANS
Filed Feb. 18, 1959 15 Sheets-Sheet 1

INVENTOR.
ROBERT G. FRIEDMAN
BY
RICHEY, McNENNY & FARRINGTON
ATTORNEYS

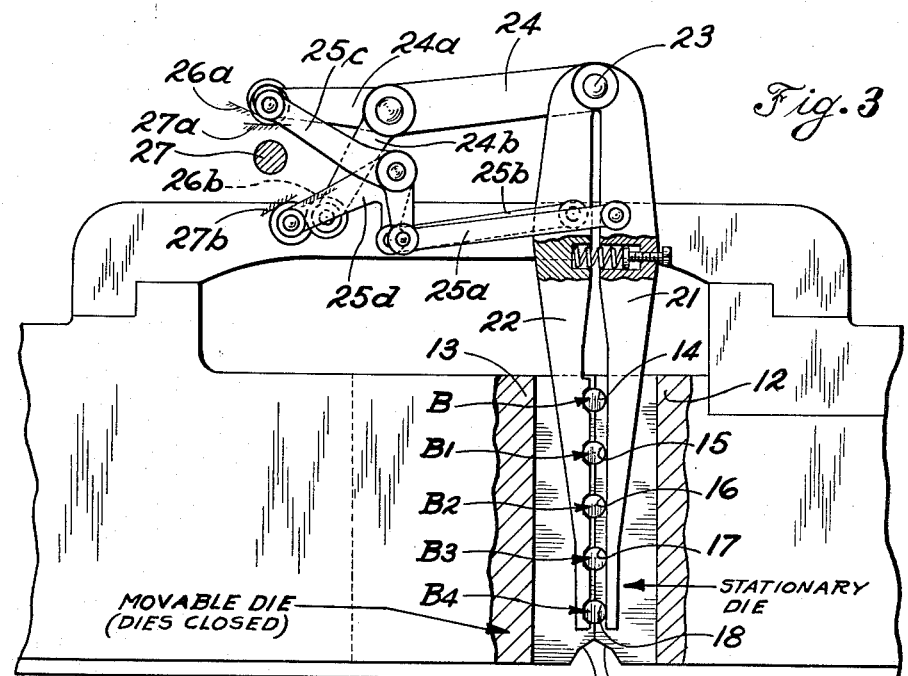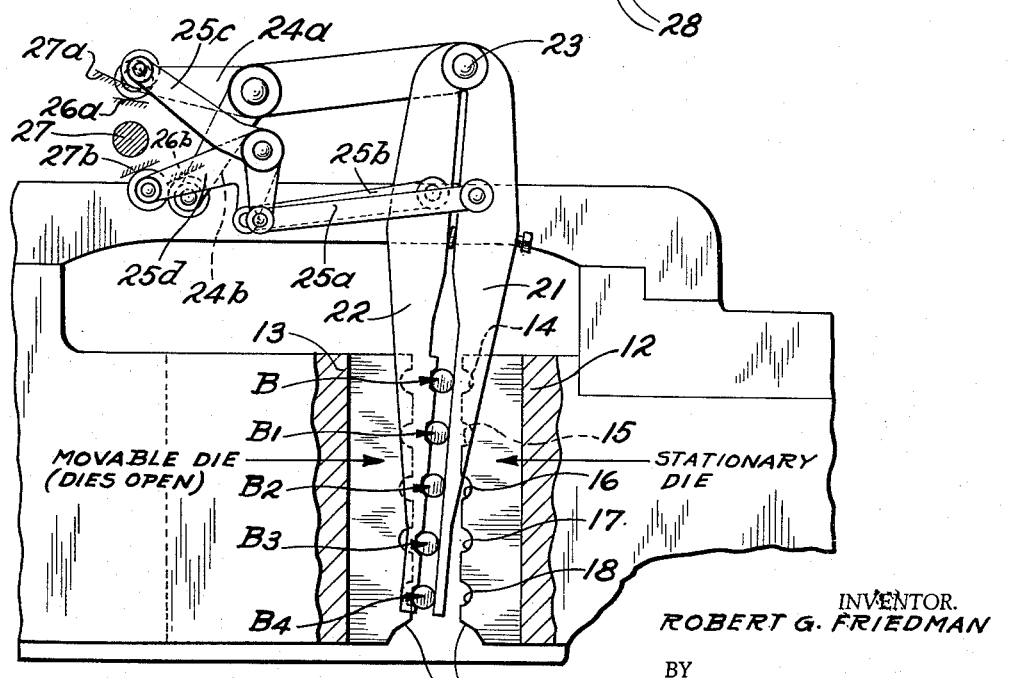

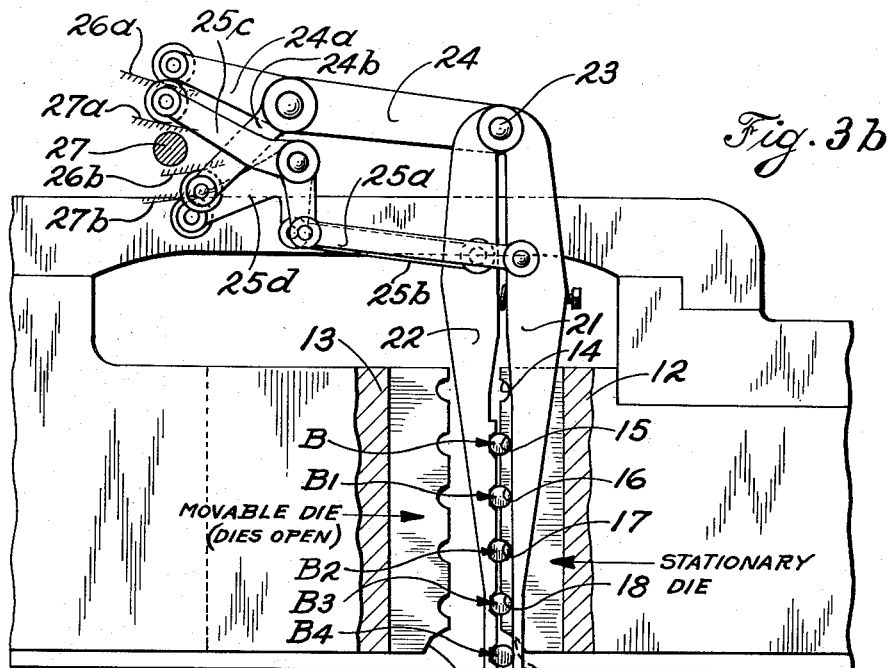
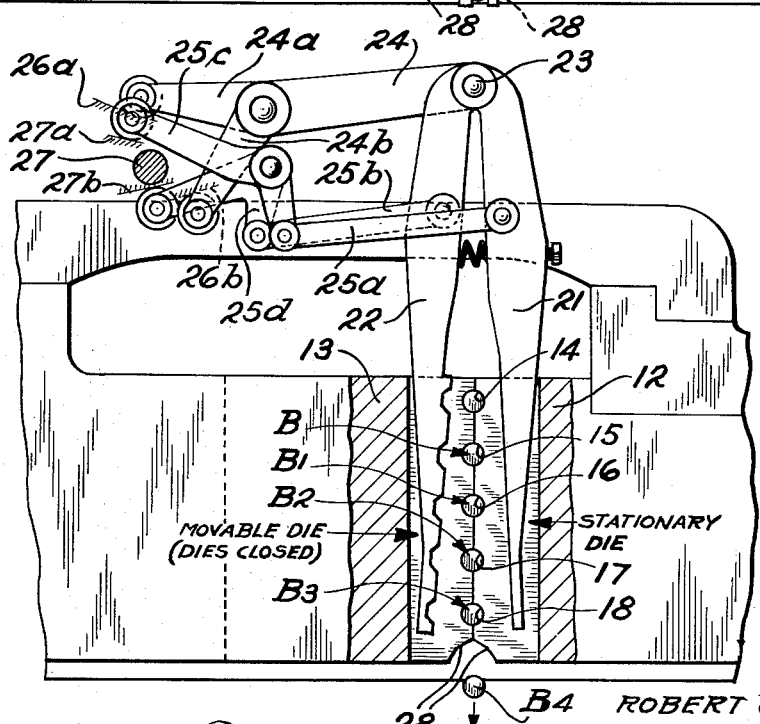

INVENTOR.
ROBERT G. FRIEDMAN
BY
RICHEY, McNENNY & FARRINGTON
ATTORNEYS

Aug. 29, 1961
R. G. FRIEDMAN
2,997,725
TONG FEED FORGING MACHINE WITH SUPPLEMENTAL
WORK SUPPORT AND TRANSFER MEANS
Filed Feb. 18, 1959
15 Sheets-Sheet 6
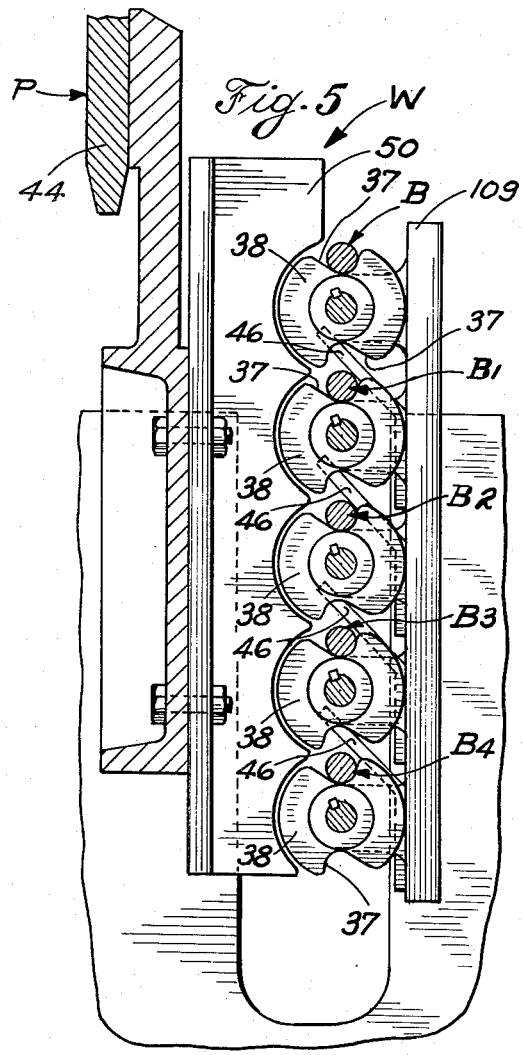
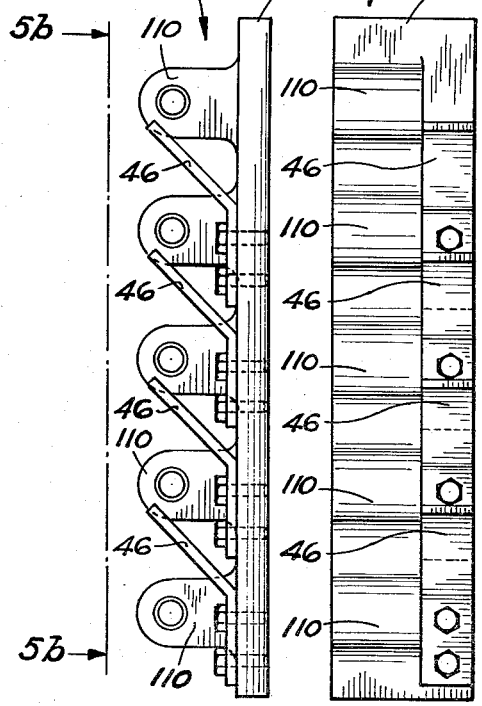
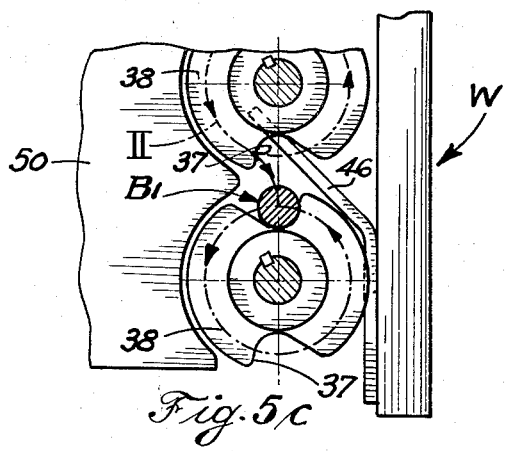
INVENTOR.
ROBERT G. FRIEDMAN
BY
RICHEY, McNENNY & FARRINGTON
ATTORNEYS

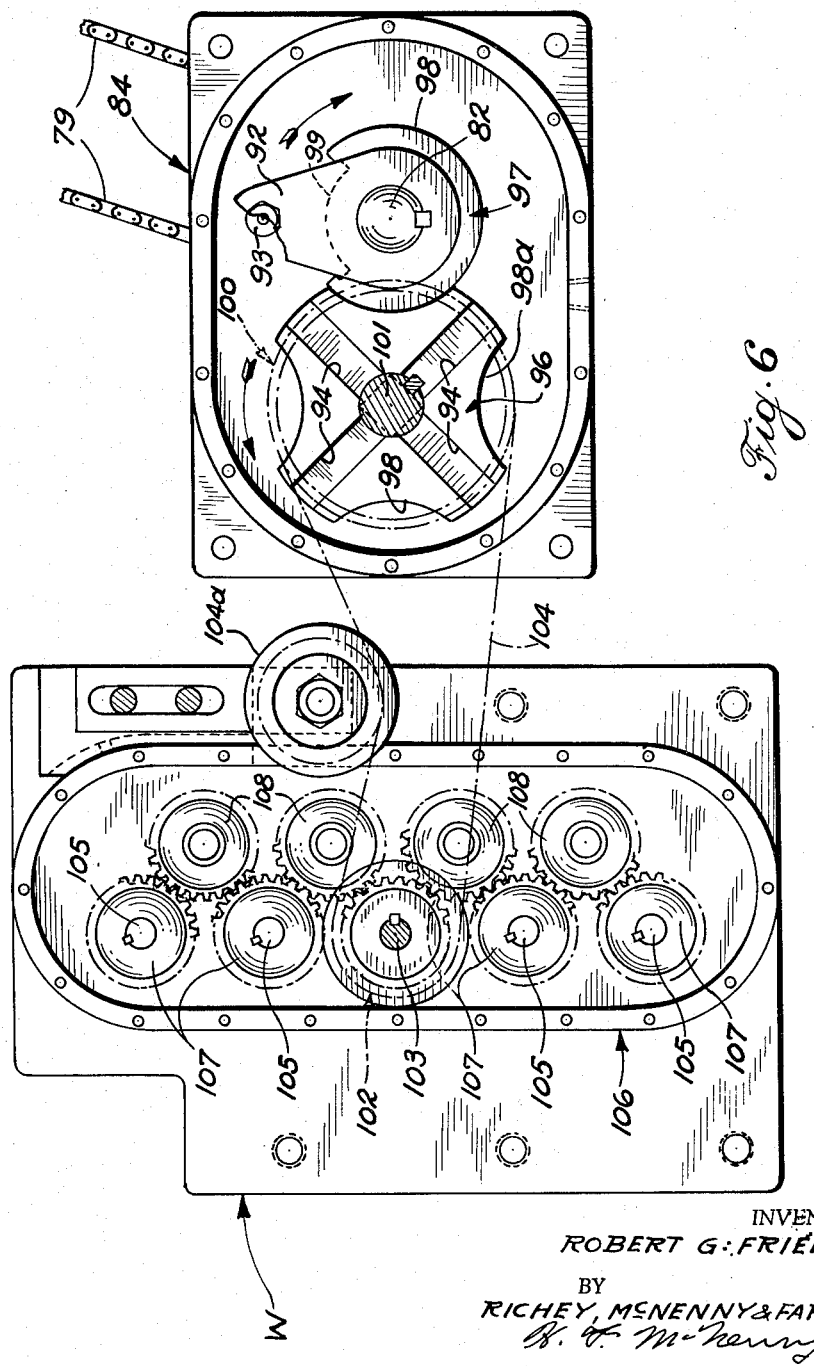

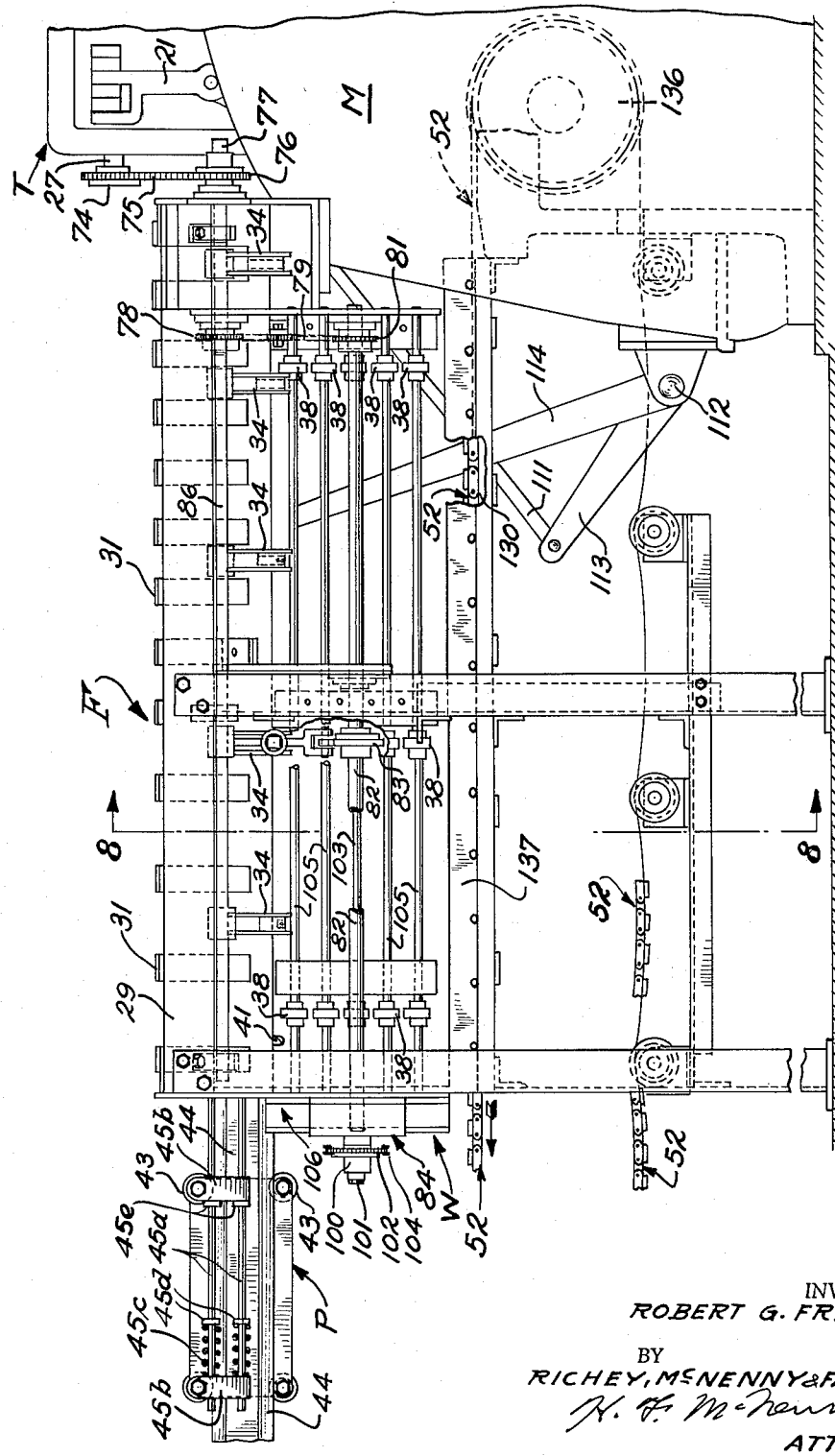

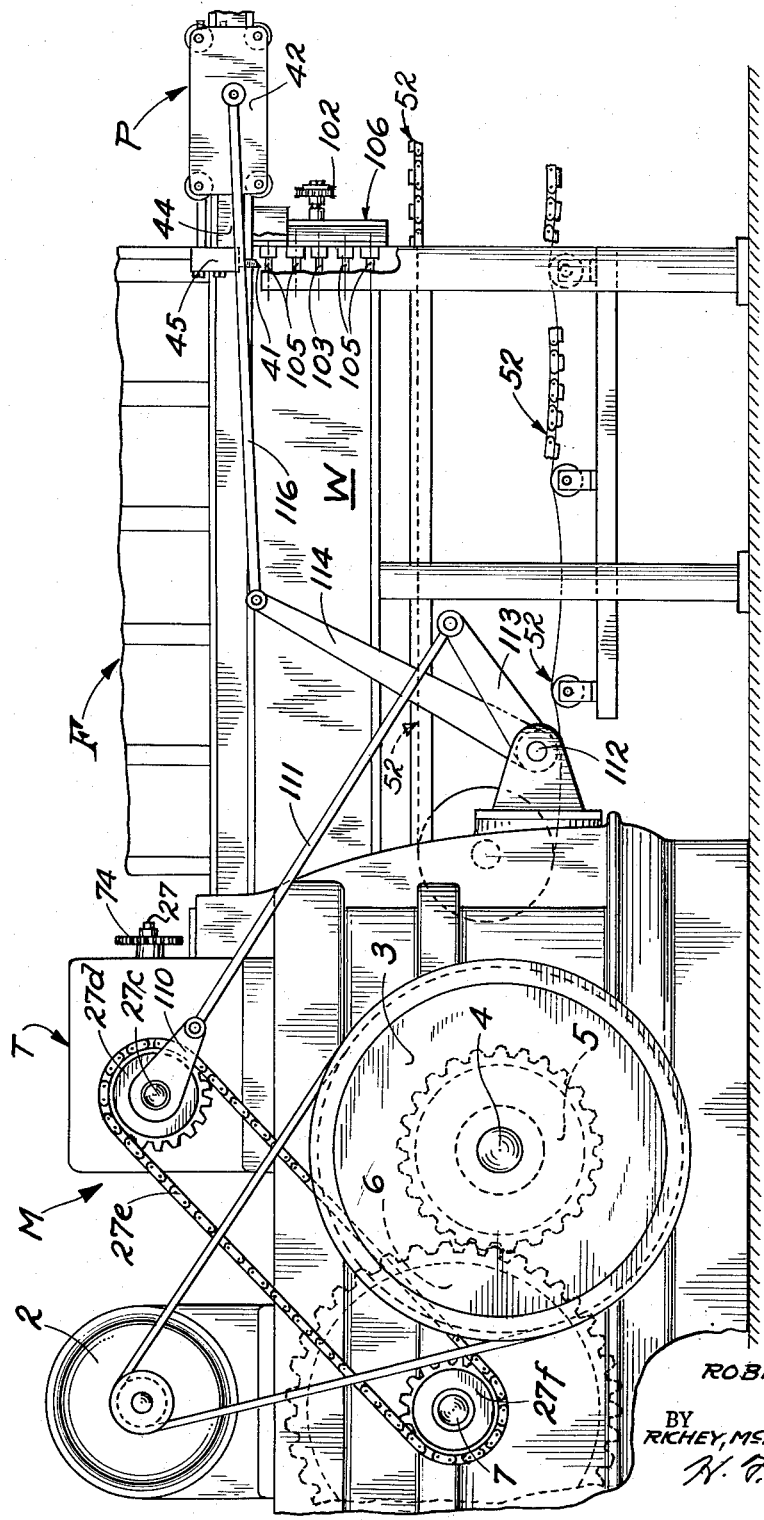

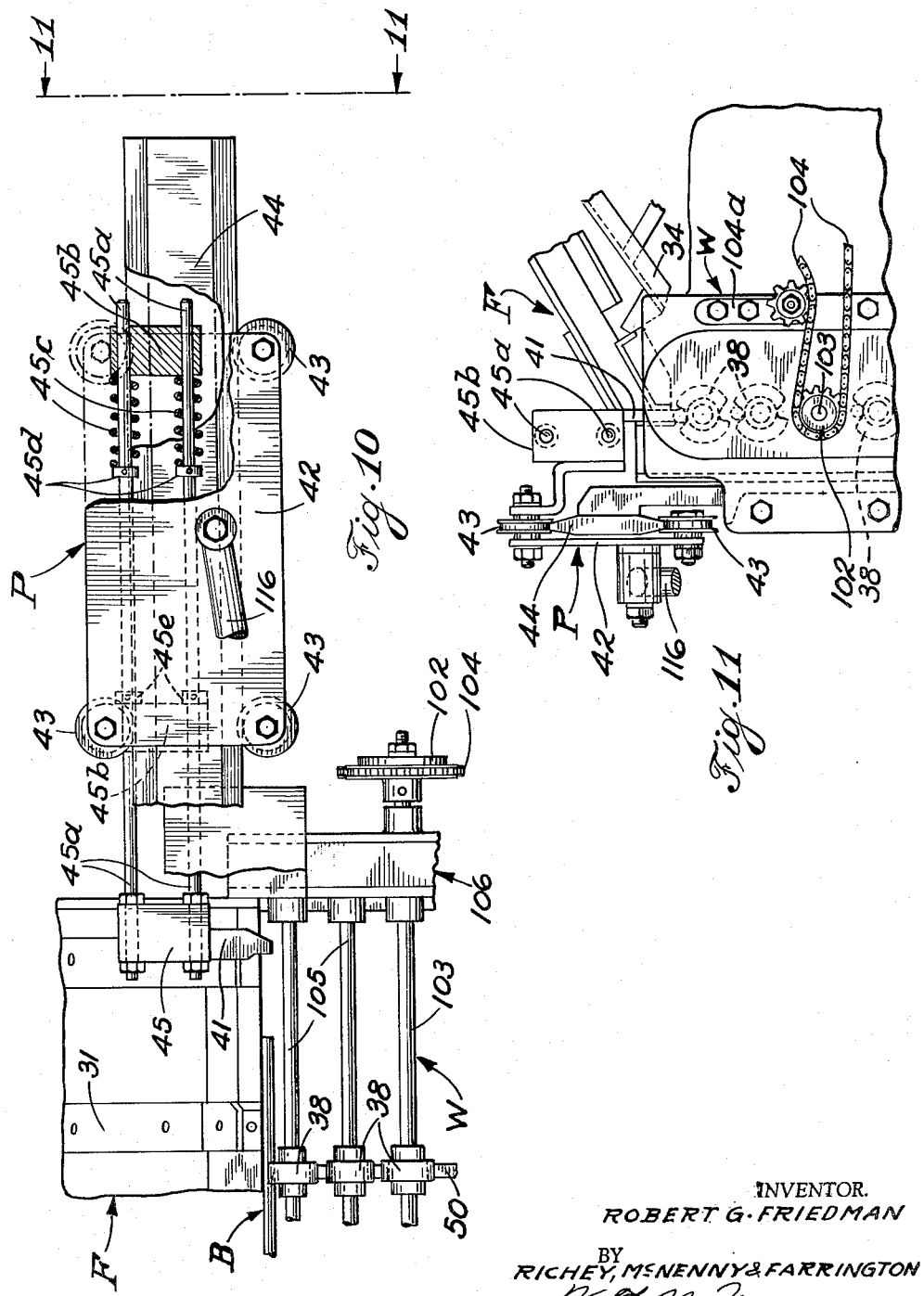

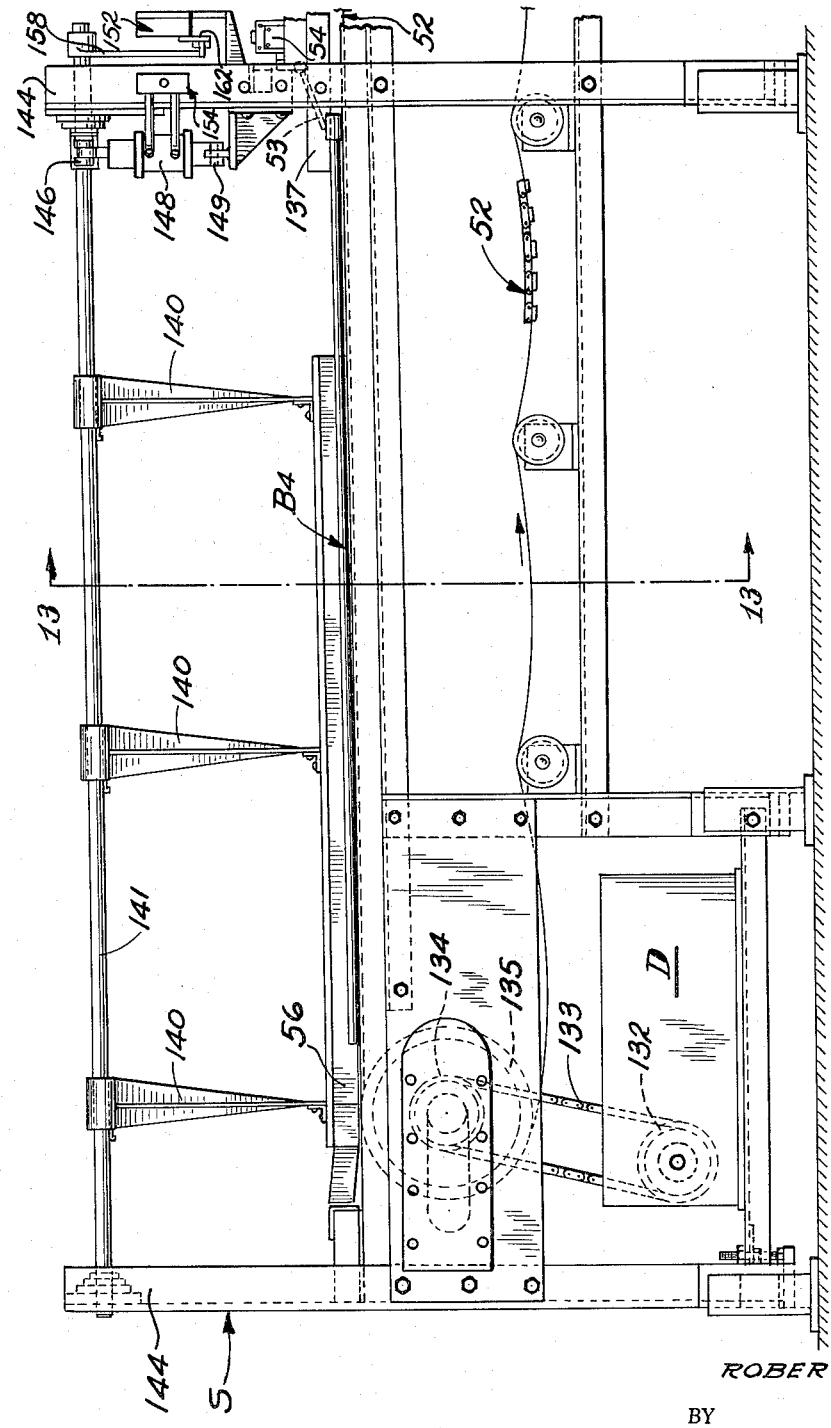

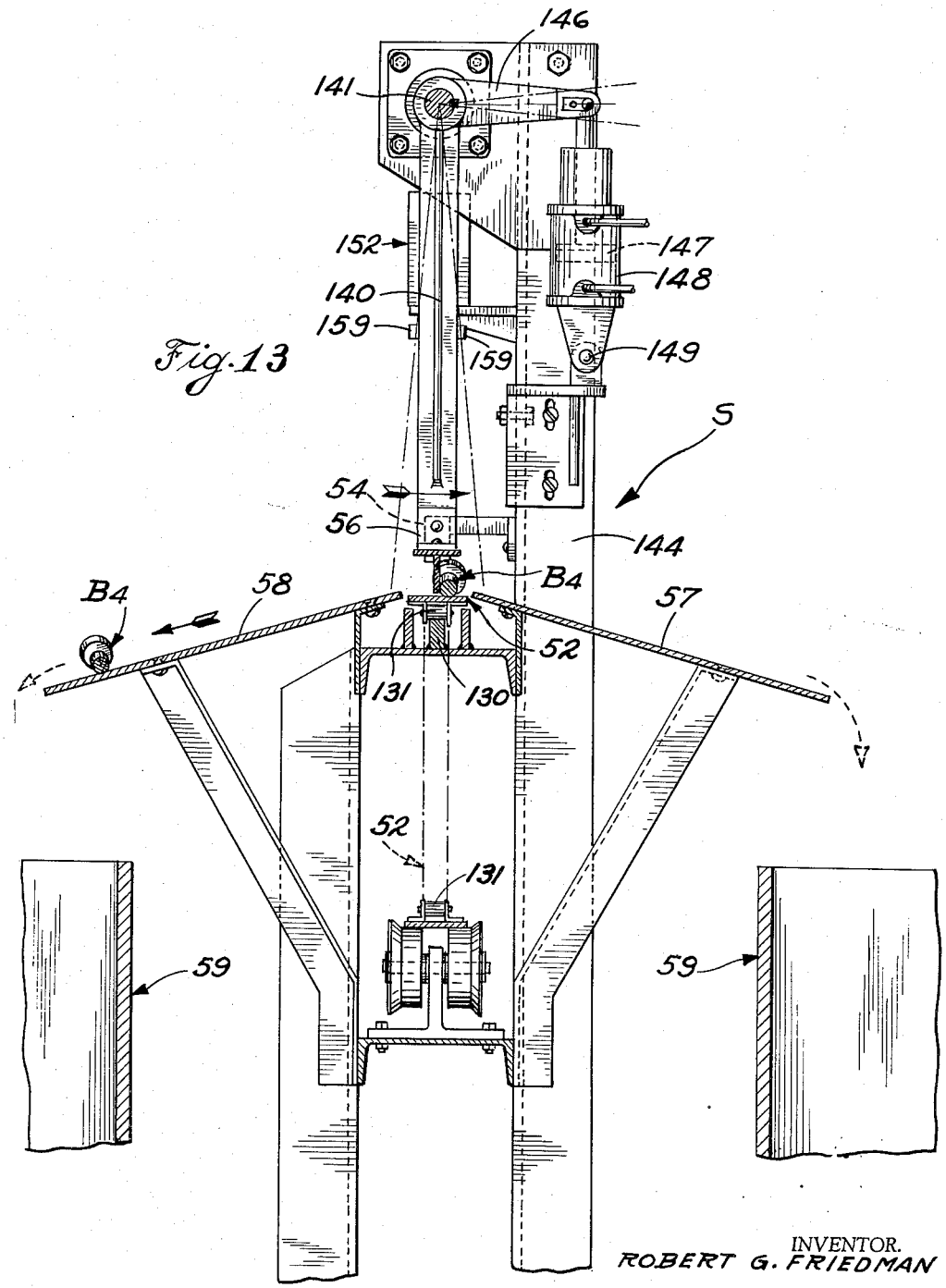

Aug. 29, 1961 R. G. FRIEDMAN 2,997,725
TONG FEED FORGING MACHINE WITH SUPPLEMENTAL
WORK SUPPORT AND TRANSFER MEANS
Filed Feb. 18, 1959 15 Sheets-Sheet 14
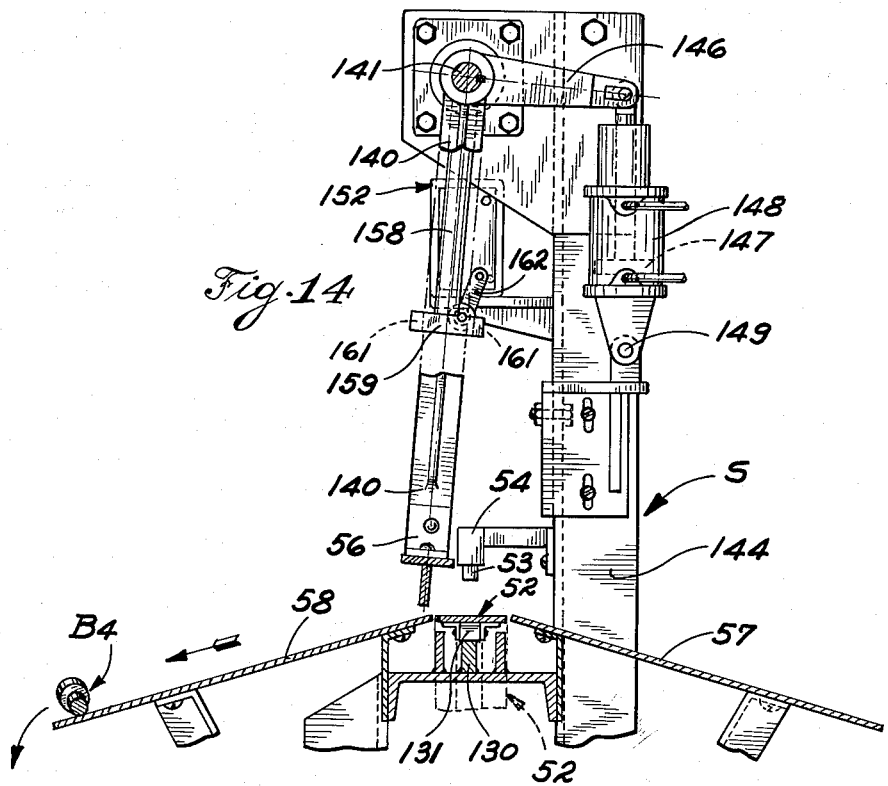
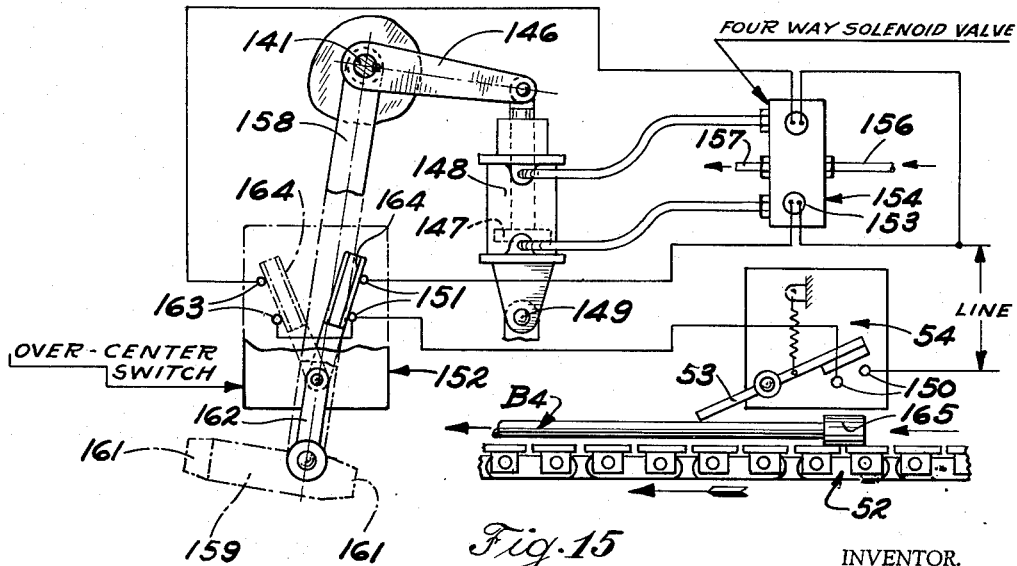
INVENTOR.
ROBERT G. FRIEDMAN
BY
RICHEY, McNENNY & FARRINGTON
ATTORNEYS

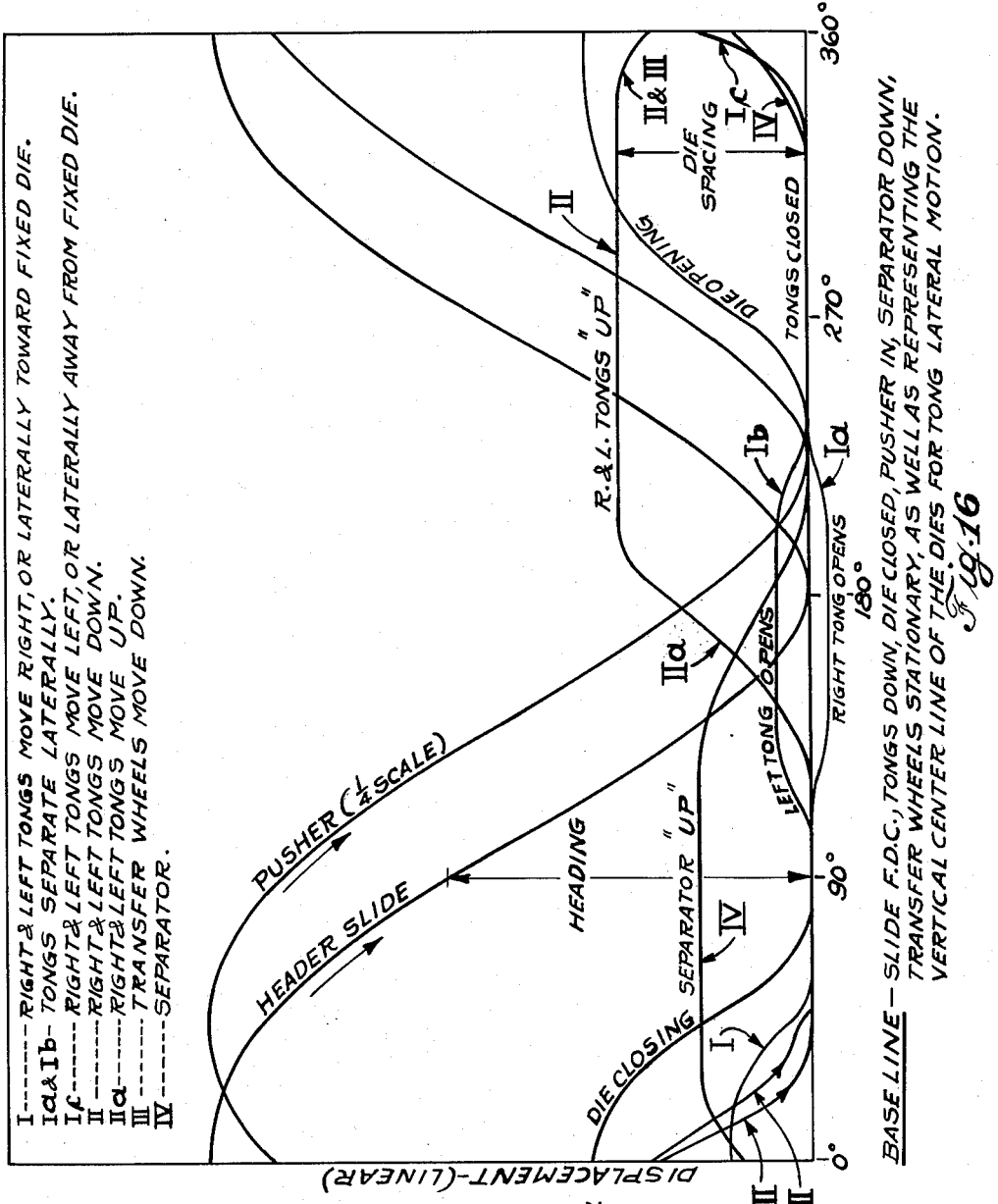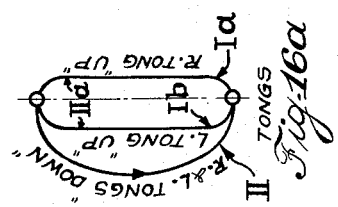

United States Patent Office 2,997,725
Patented Aug. 29, 1961

2,997,725
TONG FEED FORGING MACHINE WITH SUPPLE-
MENTAL WORK SUPPORT AND TRANSFER
MEANS
Robert G. Friedman, Tiffin, Ohio, assignor to The National Machinery Company, Tiffin, Ohio, a corporation of Ohio
Filed Feb. 18, 1959, Ser. No. 794,101
20 Claims. (Cl. 10—12)

This invention relates to metal working apparatus and more particularly to automatic blank heading or forging machines of the multiple die station type. In such machines, heading or forging operations are carried out in sequence by shifting the blanks from one die station to another and each blank has an operation performed thereon with each stroke of the header slide until the required operation is completed. At least one of the die halves is a movable, or grip die that opens and closes between forging or upsetting operations to free the blanks for transfer from die station to die station, and to release the completed article. It has been customary in these machines to provide blank carrier devices, preferably in the form of what are known in the art as "tongs" for gripping the blanks when the slide has retracted from the work and the dies are opened, and moving each of them simultaneously downwardly to the next die station, it being understood that the terminal or lowermost blank has been completely formed and is therefore cleared, by the tongs, of the die impression in which it had been contained, and this piece is thus discharged as a completed forging.

The tongs and their operators are built into the forging machine so that the tongs are disposed at the die faces disposed at the front of the machine, that is the faces of the dies that are away from the header slide and punches. Although such tongs are suitable for the handling of relatievly short cut blanks, since the tongs are necessarily restricted in their axial dimensions, the force of gravity acting on the long length of the blanks projecting out past the tongs tends to pull the blanks out of axial alignment with the dies so that the blanks may be cocked in a verical direction and hence may be pinched or nipped by the dies as the grip die closes. In accordance with this invention, a synchronized blank transfer mechanism is provided at the front of the machine that cooperates with the tongs and moves the blanks in generally the same path as that imparted to the blanks by the tongs, so that long blanks will be precisely presented to the dies as the grip die closes. These synchronized blank transfer devices need not open as do the tongs to clear blanks after they have been lowered and gripped in the dies, and therefore can be made in a form that provides a simple and yet positive mechanical transfer action. In the preferred embodiment of the invention, there is a new assembly wherein blank shifting tongs are provided at or near the front of the dies, and a series of notched wheels or disks are mounted on shafts parallel to the axes of the die impressions, and these notched wheels are driven by an intermittent motion device, such as a Geneva stop, so that there is a simultaneous shifting of the blanks by forces applied near their ends, which insures that the blanks will be axially aligned with the die impressions in the fixed die and will not be pinched when the grip die is closed.

The apparatus of this invention, as mentioned, is capable of heading long blanks, such as mine roof bolts, and these blanks may be over six feet long and may have a diameter of ¾ inch, and yet, because of the precise blank-handling features of the invention, the machine can be operated at high speed and can, for example, produce 40 headed, ¾" diameter, 6 foot mine roof bolts a minute. The nature of the heads of the bolts is not material to the invention so, for ease of illustration, the bolt heads are shown to be cylindrical, but they may actually be square or hexagonal.

This high speed operation may result in the production of as much as 12 tons of bolts per hour, which production presents handling problems. In this regard, another feature of a preferred embodiment of the invention is that of providing apparatus to conveniently dispose of the finished, headed blanks or bolts. Briefly, this is accomplished by providing a conveyor chain beneath the dies and the transfer wheel assembly which conveyor transports headed blanks to the blank-distributing mechanism. The latter mechanism includes a sweeper bar that swings from side to side, sweeping blanks alternately to opposite sides of the conveyor into suitable receptacles. The sweeper bar is triggered by a switch device that is actuated by the heads of the bolts as they are carried under the sweeper bar by the conveyor.

The unheaded blanks may not always be cut from the rod stock to exactly the same length, yet each blank must be accurately pressed against the stock gauge at the dies by a blank pusher or feed mechanism, which pusher is best positively driven in synchronization with the forging machine to maintain the necessary timing. To this end, a blank pusher finger is mounted on a carriage that moves along a rail that is parallel to the shafts of the transfer wheels, and the pusher carriage is reciprocated by a pitman arm and link assembly, driven by the forging machine crankshaft. The pusher finger is spring mounted on its carriage to provide for a spring relief or over-travel when all but the shortest length expected blanks have been pressed against the fixed stock gauge.

Having described the general nature of an apparatus embodying the invention, a more detailed description thereof will now be briefly summarized. A blank feed apparatus formed according to this invention is connected in conjunction with a forging machine of the type having vertically spaced die stations, and as mentioned, the apparatus is particularly adapted for use in the manufacture of long blanks or articles, such as mine roof support bolts. Rod stock is cut into blanks of the desired length and threaded at one end by a thread-rolling machine (not shown) and forming no part of the invention. The parts of the blanks to be headed may be heated before introduction of the blank to the apparatus. The threaded (and possibly heated) blanks are then placed in the hopper of a feed apparatus and, at predetermined intervals, a single blank is raised by a row of separator fingers whereupon it rolls down a chute to a load position in which the new blank is resting in the notches of the upper row of transfer wheels of the blank-carrying or transfer mechanism. At the correct time, the pusher engages the forward end of the upper, or newly loaded, blank and moves it into the forging machine, between the tongs and through an upper die recess or loading station to a position wherein the end of the new blank is pressed against a stock gage mounted on the fixed die of the forging machine, so that the new blank is properly axially positioned in the forging machine dies. The blanks below, which have been respectively transferred into their respective dies, are then worked upon by the forging tools as the header slide advances, and thereafter the newly fed blank (which was not engaged by a forging tool on this stroke) and the partially forged blanks are all moved down sequentially through a series of die stations. Simultaneously, the lowermost or finished blank is released by both the tongs and the transfer mechanism and so drops onto the conveyor chain that runs beneath the dies and extends forwardly past the transfer mechanism. During the blank carrying or transfer movement of the blanks from die station to die station, the end of the blank at the forging machine is controlled by the long feed forming a part of the forging machine, as mentioned. Under the preferred form of this invention, the notched transfer wheels are operated intermittently by a Geneva stop drive that is synchronized with the forging machine so that the blanks are held stationary, at each die station, during the forging or heading portion of the cycle, whereupon the blanks are transferred, by both the transfer wheels and the tongs, through a generally semi-circular path to the next lower die station. Because of this combination of blank handling elements and a metal working, upsetting, or forging machine, there is no problem in regard to nipping or pinching the blanks as the die closes, which might jam the machine, with the additional advantage that safe, high-speed operation is possible.

As mentioned, the sweeper bar, mounted above the conveyor, sweeps the finished parts or bolts alternately to opposite sides of the conveyor into suitable receptacles so that the large volume of blanks that can be produced because of the high speed operation made possible by the transfer mechanism is readily handled and disposed of.

The manner by which these advantages and features may be attained will be apparent to one skilled in the art from the following detailed description of a preferred embodiment of the invention.

In the drawings:

FIGS. 3 to 3c are front views of the forging machine showing the tongs and tong actuating levers. The four cams that actuate the long levers are indicated schematically, in these views, for clarity.

FIG. 3 shows the tongs closed and in their "up" position gripping the newly fed blank and the partially forged blanks while the grip die is closed.

FIG. 3a shows the grip die opened with the tongs still closed, the tongs having been moved laterally to the left in the figure to clear the blanks from the fixed die.

FIG. 3b shows the tongs, still closed, but in their lower position having shifted the blanks downwardly to match the die impressions, the finished blank being ready for release.

FIG. 3c shows the tongs opened and again lifted after the dies have closed and gripped the blanks in process, the finished blank dropping to the conveyor (not shown).

FIGS. 5 to 5c show various details of the blank transfer wheel assembly.

FIG. 6 is a front view of the drive portion of the blank transfer wheel assembly, showing the Geneva drive and the gear case for the transfer wheel shafts, with the chain drive between these parts indicated in dot-dash lines.

FIG. 7 is a side view of the blank supply or separator unit as well as the transfer wheel mechanism. The stock pusher also appears in this view.

FIG. 9 is a side view of the stock transfer and pusher mechanism taken from the opposite side of the machine as it is shown in FIG. 7.

FIG. 10 shows details of the preferred pusher carriage construction.

FIG. 11 is an end view of the pusher mechanism shown in FIG. 10.

FIG. 12 is a side view of the blank discharge or distributor mechanism including the sweeper bar assembly.

FIG. 13 is an end sectional view of the blank distributor assembly of FIG. 12, taken as indicated at 13—13 on that figure.

FIG. 14 is a fragmentary end view similar to FIG. 13 with the arms that support the sweeper bar broken away to show the sweeper control arm and the four-way valve control or sequence switch.

FIG. 15 is a schematic diagram of the sweeper bar control and sequencing circuit. The four-way valve is indicated in outline only.

FIG. 16 is a timing diagram for the major units of a typical embodiment of the invention.

FIG. 16a is a diagram showing the path taken by one blank-carrying portion of the tongs during a cycle.

FIG. 16b is a diagram showing the path by which the transfer wheels lower blanks from die to die during the 180° of rotation that represents one revolution of the forging machine crankshaft.

Figure 1:
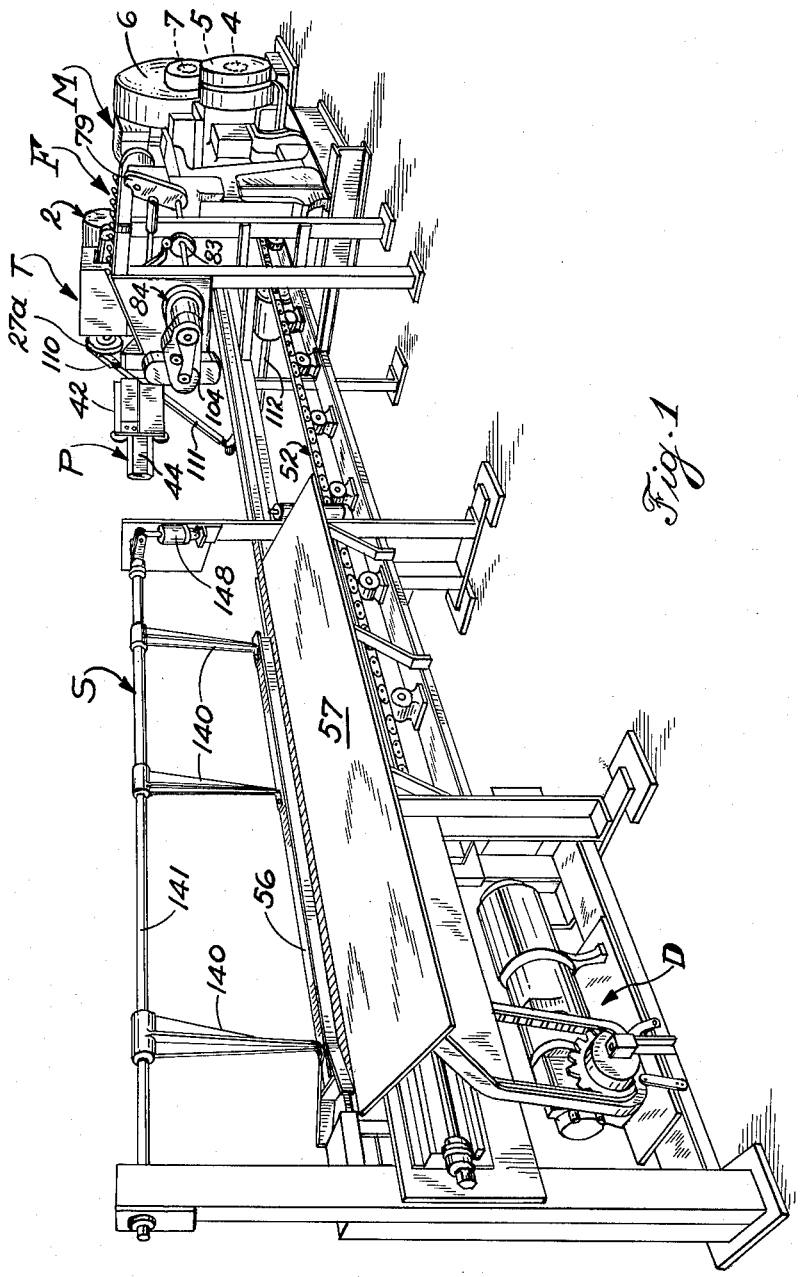
FIG. 1 is a general perspective view of a forging machine and blank handling apparatus embodying the invention.
Figure 2:
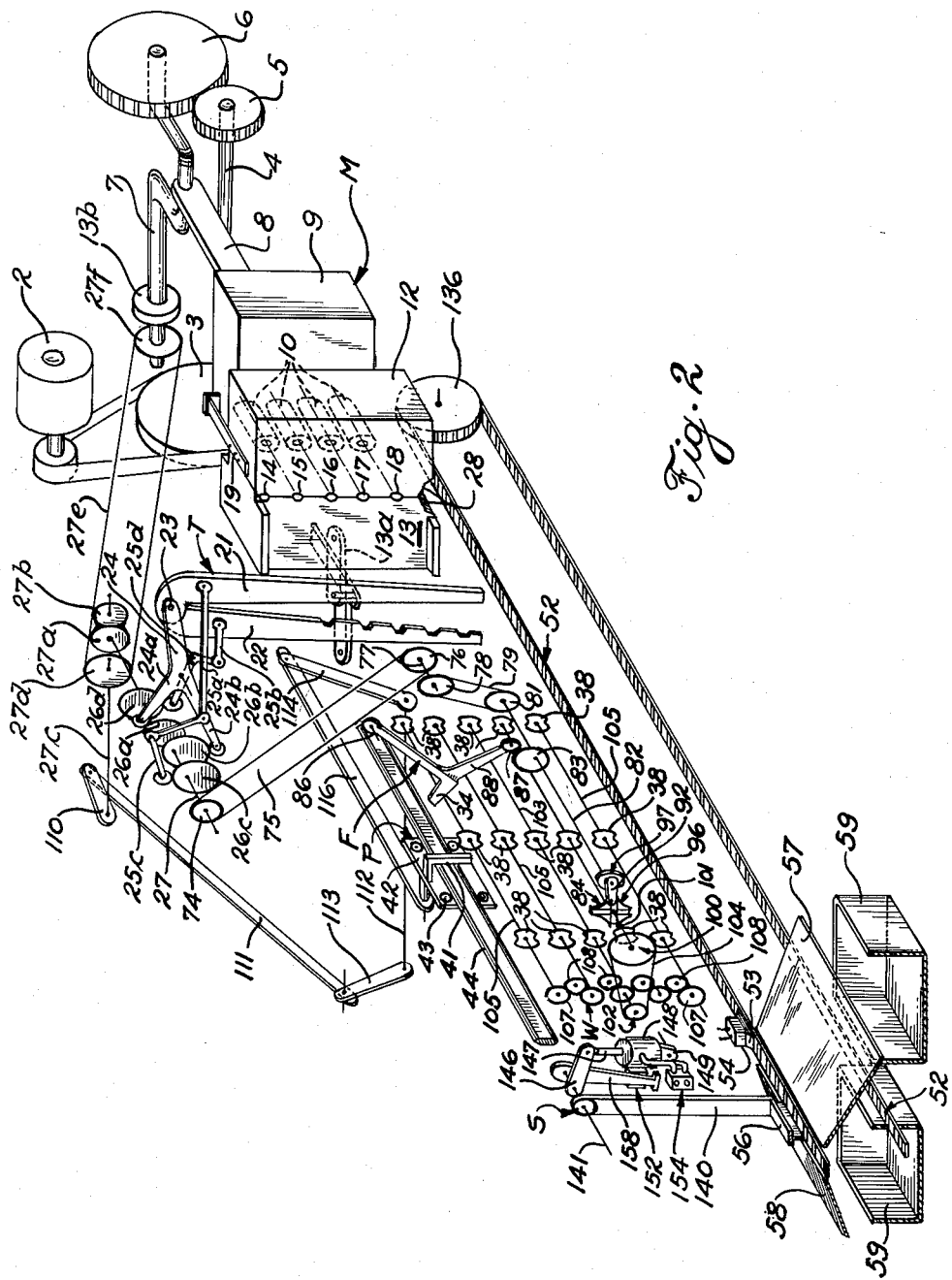
FIG. 2 is a highly simplified schematic drawing of the apparatus shown in FIG. 1, intended primarily to illustrate the driving connections between the various parts.

The general disposition of the basic parts of the forging and blank handling elements of a preferred embodiment of the invention appears in FIG. 1, which is a general perspective view of the system, and in FIG. 2, which is a highly schematicized diagram of the major elements generally disposed as indicated in the perspective view of FIG. 1. Here are shown the forging machine M carrying the tong assembly T, the blank supplying and separator unit F, the blank pusher assembly P, the blank transfer wheel unit W, and the bolt distributor and sweeper mechanism S.

Referring to FIG. 2, the forging machine M is of the type like that of Clouse Patent 1,905,620. The forging machine is driven by a motor 2 that drives a large pulley 3 connected to a countershaft 4 carrying a drive pinion 5 meshing with a large gear 6 on the crankshaft 7. The connecting rod 8 reciprocates the header slide 9 in the machine frame, the slide moving in suitable guides (not shown), and the slide carries heading tools or punches 10, one for each forging die station.

Figure 4:
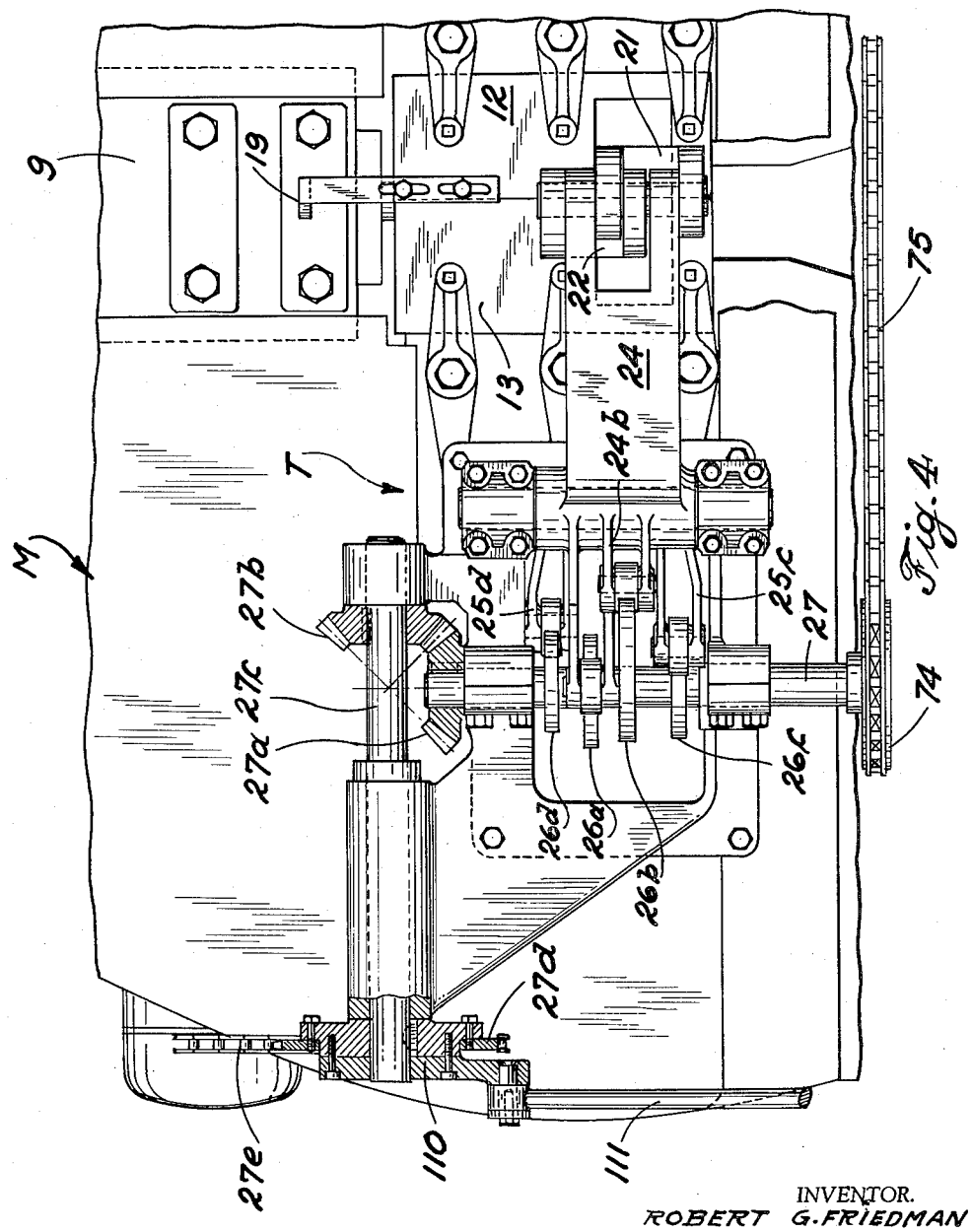
FIG. 4 is a plan view of the tongs and their actuating mechanism showing the countershaft that operates the pusher, the bevel gear drive for the tong control camshaft, and the four actuating cams for the tong levers.

Referring to FIGS. 2–4, the die breast of the forging machines includes a stationary die 12 and a movable, or grip die 13, which is laterally actuated relative to the stationary die 12 by toggle means 13a (FIG. 2) connected to a slide (not shown) that moves parallel to the header slide under control of a cam 13b on the crankshaft, a suitable construction of this type appearing in the aforesaid Clouse patent. The grip die 13 moves between a closed position shown in FIGS. 3 and 3c, and an open position shown in FIGS. 3a and 3b. The dies 12 and 13 have axial recesses or die impressions that cooperate to form a blank receiving station 14 slightly larger than the stock, and, in the form shown, four gripping stations: 15, 16, 17, and 18, all disposed on the vertical centerline of the machine.

In order to progressively transfer the blanks from the feed station 14 to the top die station and to transfer the other blanks from one die station to the next, blank carrier means in the form of a tong feed mechanism is provided. Also, as indicated in FIG. 2, a stock gauge or stop 19 is located on the fixed die above the blank receiving station 14 and provides an abutment against which the end of the new blank is moved to axially position the blank between the dies. To transfer the blanks to be forged progressively from the load position 14 through the forging stations 15—18, tong mechanism T, including a pair of tongs 21 and 22, are provided. Details of the tong actuating mechanism itself are not part of the invention except that the transfer mechanism is arranged to cooperate with the motion of the tongs and all must be synchronized with the forging machine. For this reason, a suitable tong construction and cam drive for the tongs will first be described.

The tongs 21 and 22 are pivotally connected together at 23 and at least one tong is notched so that the tongs operate to grip the blanks and move them laterally to clear the impressions in the fixed die 12 as well as moving downwardly along the die breast by a vertical distance equal to the vertical spacing between adjacent dies.

Referring to FIGS. 2–4, both tongs are raised and lowered simultaneously by a double bell crank lever 24, having cam roller arms 24a and 24b, and the tongs are individually opened and closed, as well as being moved laterally together, by links 25a and 25b connected to bell cranks 25c and 25d respectively. The various lever arms or bell cranks are positioned individually by four cams: cams 26a and 26b being provided for raising and lowering the tongs, and cams 26c and 26d for opening and closing the tongs, as well as for moving them laterally while closed. The contour of the tong operating cams is such as to provide a tong motion indicated in diagrams 16 and 16A so that the cams and linkage move the tongs 21 and 22 through a cycle of operations, the key positions being shown in FIGS. 3 through 3c.

As seen in FIGS. 2 and 4, the tong operating cams are mounted on a camshaft 27 driven by a bevel gear 27a meshed with a bevel gear 27b on a counter shaft 27c to which is keyed a sprocket 27d driven by a chain 27e from another sprocket 27f mounted on crankshaft 7. Chain 27e and sprockets 27d and 27f also appear in FIG. 9.

When a new blank B has been positioned against the stock gauge 19 (FIG. 2) the tongs are in the position of FIG. 3 and close to grip the new blank B as well as to grip the partially headed blanks, $B_1$, $B_2$, $B_3$, and the completed blank $B_4$. The tongs are then moved by the cams 26c and 26d to the position of FIG. 3a in a generally semi-circular path, partially down and to the left in the figure, to clear the fixed die, and then completely down and to the right whereupon the blanks are positioned in the next lower die stations 15—18 in the fixed die, as shown in FIG. 3b. The grip die 13 now closes to grip the blanks for the forging operation. The tongs are then laterally spread or opened by the cams 26c and 26d and the links and bell cranks 25a—25c as shown in FIG. 3c, and cams 26a and 26b and linkage 24, 24a and 24b lift both tongs, while open, to their upper position of FIG. 3, whereupon they are again closed to grip a new blank positioned against the stock feed stop 19 in the blank-receiving station 14, as well as to grip the blanks in dies 15, 16 and 17.

This operation continues and, once a blank is located at each die station, four blanks B, $B_1$, $B_2$ and $B_3$ are transferred progressively downward through the stations 14, 15, 16, 17 and 18, and a finished blank is ejected during each cycle of the machine.

To permit ejection of the completed blank $B_4$, the dies 12 and 13 are notched out as indicated at 28, below the lowermost forging station 18. The tongs are lowered to align the blanks in process with the forging stations 15, 16, 17 and 18, the completed blank $B_4$ is positioned in the notches 28, as shown in FIG. 3b. After the dies have closed, the tongs separate and move upwardly, dropping the completed blank $B_4$, the opposite end of which has already been released by the transfer wheel apparatus W. The tong feed T cooperates with the transfer wheel apparatus W according to this invention to accurately support long blanks as they are progressively moved between die stations. However, the ends which are to be forged are securely gripped by the tongs whereas the remainder of the length of the blanks are supported on the notched transfer wheels and are each moved through a generally semi-circular path corresponding to that imparted to the blanks by the downward tong motion. The tongs firmly grip the blanks at the ends adjacent to the dies so that the blank will be positioned properly in each die. However, the remainder of the blanks need not be supported in quite such a precise and rigid manner, but need only be transferred in a path that relieves the tongs of part of the cantilever load, particularly at the end, or lower stage in the transfer cycle when the grip die closes. These results are readily obtained by the preferred form of notched wheel transfer mechanism working in synchronization with the tongs.

Figure 8:
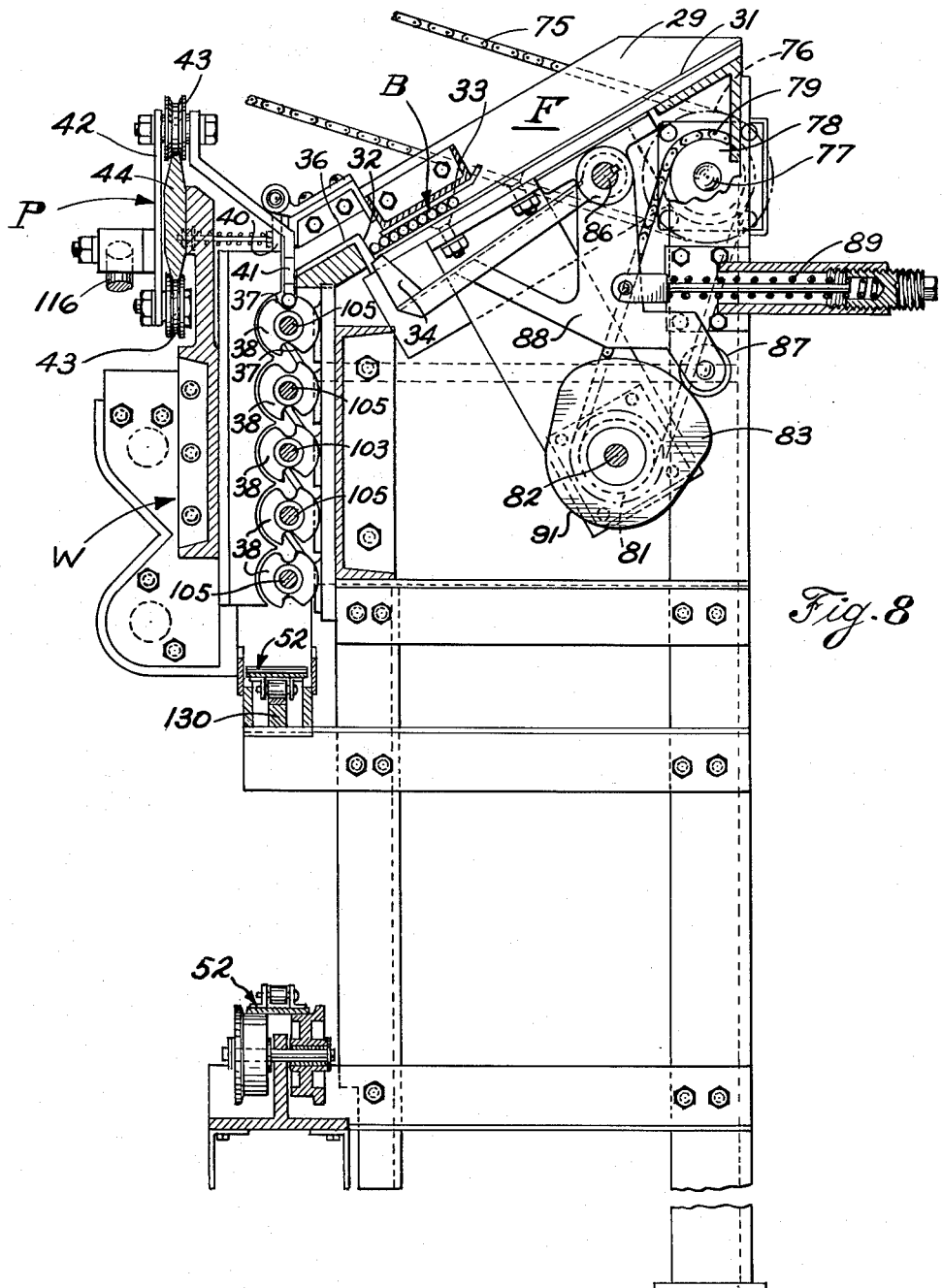
FIG. 8 is an end view of the mechanism shown in FIG. 7 taken on 8—8 of FIG. 7. The pusher finger is shown somewhat diagrammatically in this view for clarity of illustration.

The feed mechanism F delivers unheaded and possibly end-heated blanks to the transfer mechanism W. Referring now to FIGS. 5–8, the blanks B that are ready for heading are placed in a hopper 29 and they roll down inclined supports 31, the bottom blank resting against a fixed stop 32. To insure that there is only a single row of blanks leading to the stop 32, upper guide 33 is mounted above the inclined bottom support 31 of the hopper 29 and is spaced therefrom by a distance somewhat greater than the blank diameter. At the correct time, as indicated in the timing diagram of FIG. 16, the blank B which is positioned against the stop 32, is raised by a row of axially spaced fingers 34 (by mechanism to be described presently) up over the stop 32 so that a single blank rolls down an inclined surface 36 and drops into the upper of a pair of diametrically opposed recesses 37 formed in an upper row of axially spaced transfer wheels 38. The blank is now positioned in alignment with the stock receiving die 14. As seen in FIG. 8, a lightly biased spring-pressed plate 40 assists in guiding the forward end of the new blank down into the notches in the transfer wheels.

After the blank is located in the recesses 37 of the upper row of transfer wheels 38, a pusher finger 41 engages the end of the blank and moves it axially along the transfer wheels, through the die recess 14 and into engagement with the stock gauge 19. The pusher finger 41 is supported on a carriage 42 having rollers 43 which engage opposite sides of a rail 44 that is parallel to the die recesses. Pusher finger 41, as best seen in FIGS. 10 and 11, is perferably mounted to slide in spaced blocks 45b suspended, by suitable brackets, from the carriage. Springs 45c and collars 45d (FIG. 10) urge the pusher finger forward, this motion being limited by stop collars 45c. This construction provides for spring relief or over-travel for all but the shortest blanks, and makes it unnecessary to have each blank cut to precisely the right length, yet each blank will be accurately positioned in the dies. The mechanism that drives the pusher carriage will be described presently.

The mechanism thus far described properly positions the new blank B against the stock gauge 19 in the load position so that, after the blank has been slid along the upper row of transfer wheels, the tongs 21 and 22 can grip the blank (and the other blanks in the dies 15—17) as shown in FIG. 3. As the tongs 21 and 22 move to transfer the blanks downwardly, the transfer wheels 38 are rotated in a synchronized manner in a counterclockwise direction through one-half turn. This causes the blanks contained within the upper recesses 37 to move through a semi-circular path to the left, as seen in FIGS. 5 and 5c, and downward until they engage deflector fingers 46 and the blanks are thereby transferred to an upwardly moving recess 37 in the next lower row of transfer wheels 38. During most of the 180° counterclockwise rotation of the transfer wheels (as seen in FIGS. 5 and 5a) the blanks are retained in their notches or recesses 37 by a row of contoured guide plates 50 disposed at one side of the sets of vertically aligned transfer wheels.

The finished blank or bolt $B_4$ drops out of the lower row of transfer wheels onto the upper reach of a conveyor chain 52 which is travelling to the left, as viewed in FIGS. 7 and 12, to move such blanks out from under the transfer apparatus W.

The forged blank is transported by the chain 52 until the head of the blank engages a sensing arm 53 on a microswitch 54 shown in FIGS. 12, 14 and 15, and at this time, the shank of the blank extends along a pneumatically operated sweeper bar 56 which is controlled by the microswitch 54 and is moved laterally to push blanks off alternate sides of the chain 52 and down one or the other of inclined surfaces 57 or 58 into containers or bins 59 (FIG. 2).

Having described a suitable tong-operating mechanism as well as the basic elements and operation of the various units in relation to the forging machine, the following discussion describes certain drives and the operation of certain elements of the mechanism.

Referring to FIGS. 2 and 6–9, the drive for the transfer wheel mechanism W and the blank supply and separator apparatus F are shown. As mentioned, the tong mechanism mounted on the forging machine is provided with a cam shaft 27, on which the tong operating cams are mounted. Since the camshaft drive chain 27e is driven by the crankshaft 7 of the forking machine, cam shaft 27 is positively timed or synchronized with the operation of the forging machine, the sprockets are selected so that the camshaft 27 makes one revolution for each crankshaft evolution. In order to drive the blank separator unit F and the transfer wheel unit W, a sprocket 74 is keyed to the front end of camshaft 27 over which sprocket passes a chain 75 that drives a sprocket 76 mounted on a short longitudinal countershaft 77 journalled in the frame of the transfer and feed apparatus. A second sprocket 78 is mounted on the countershaft 77 and is connected by a chain 79 to a sprocket 81 mounted on a power shaft 82 journalled in the frame of the feed and separator apparatus F, and these sprockets are also selected to drive shaft 82 at crankshaft speed. Keyed to the power shaft 82 is a cam 83 used to operate the blank separator fingers 34 as will be described below. The power shaft 82 also operates the Geneva drive indicated generally at 84, which operates the transfer wheels, as also will be described below. It should be understood that the use of chain drives to connect the various shafts insures that the various mechanisms will always be synchronized with the crankshaft of the forging machine.

Referring to FIG. 8, the separator fingers 34 extend from arms that are keyed to a rock shaft 86 which extends longitudinally along the upper portion of the frame of the unit, and oscillation of rock shaft 86 will cause the fingers 34 to move up and down. There are a plurality of arms carrying fingers 34 spaced along the rock shaft of the feed and separator mechanism and are all moved by rotation of the rock shaft 86 by cam 83 that engages a cam follower roller 87 (FIG. 8) mounted on a follower bracket 88 which is also keyed to the rock shaft 86. The cam follower roller 87 is held in engagement with cam 83 by a coil compression spring device 89 so that when a low portion 91 of cam 83 moves under the cam follower 87, the spring device 89 rotates the follower bracket 88 and the shaft 86 in a clockwise direction, as seen in FIG. 8, which causes the fingers 34 to engage a single blank at the bottom of the incline of the hopper 29 and raise it up along the stop 32, after which it rolls down the inclined surface 36 into notches 37 in the upper row of transfer wheels 38. After the low portion 91 of the cam 93 moves out from under the follower 87, the fingers are forced back to their lowered position, by the cam, as shown at FIG. 8, against the force of the spring. This spring lifting mechanism for fingers 34 prevents breakage of parts in case a blank becomes jammed in the hopper.

Thus, a single blank is fed into the transfer apparatus intermittently and in timed relation to the operation of the forging machine proper.

Referring to FIG. 6, the Geneva drive assembly 84 includes a crank arm 92 keyed to power shaft 82, and at the end of the arm is provided an axially projecting roller 93 which is formed to progressively slide into and engage the walls of one of four radial grooves 94 cut in a driven wheel 96. Therefore, rotation of the arm 92 through the complete revolution causes the roller 93 to engage one of the grooves 94 and rotate the driven wheel 96 through an angle of 90°. It should be noted, however, that the finger 93 is clear of the grooves 94 during the majority of its movement so a lost motion or intermittent driving connection is provided. To insure that the driven wheel 96 cannot move while the finger 93 is clear of the grooves 94, a locking disk 97 is keyed to the power shaft 82 adjacent arm 92 which has a peripheral circular portion 98 that engages one of four semicircular recesses 98a formed in the driven wheel 96 whenever the roller 93 is clear of the grooves 94. The locking ring 97 is interrupted at 99 to clear the driven wheel 96 so that the latter is free to turn when the roller 93 engages one of the grooves 94. In the embodiment shown, there are four grooves 94 at right angles to each other so that one revolution of the power shaft 82 produces one-quarter of a revolution of the driven wheel 96.

In order to drive the transfer wheels 38, a sprocket 100 is mounted on a stub shaft 101 projecting from the driven wheel 96 and sprocket 100 drives another sprocket 102 on the central transfer wheel shaft 103 by a chain 104. A take-up idler 104a for chain 104 is provided. The transfer wheel sprocket 102 has ½ the pitch diameter of the Geneva drive sprocket 100 so that transfer wheel 38 is driven ½ turn for each ¼ turn of Geneva wheel 96 and hence for each revolution of power shaft 82, which in turn makes one revolution for each turn of the crankshaft 7. In the illustrated embodiment of the invention, since there is one feed station and four forging stations, there are five rows of transfer wheels 38 which are each mounted on one of five parallel shafts including two upper and two lower driven shafts 105 and the central drive shaft 103. However, the drive sprocket 102 could be mounted on any of these shafts.

As seen in FIGS. 1 and 6, in order to drive transfer wheel shafts 105 from driven shaft 103, a gear case 106 is provided in which a series of gears 107 are mounted at the ends of all five transfer wheel shafts and these gears each mesh with a pair of identical idler gears 108 so that all five shafts and their transfer wheels turn simultaneously but intermittently through the same 180° angle by operation of the Geneva drive. It should be noted that the rotation of the transfer wheels takes place during an angular displacement of approximately 90° of rotation of the power shaft 82 so that the transfer of the blanks by the transfer wheels is accomplished during a short interval of time. This interval of transfer operation is substantially the same as the time interval of downward motion by the closed tongs 21 and 22.

In order to reciprocate the pusher carriage 44 and its pusher finger 41, as seen in FIGS. 2, 4, 9 and 10, a crank arm 110 is mounted on cross shaft 27c of the tong mechanism and the arm is pivoted to a downwardly extending link 111. Mounted on a rock shaft 112, that extends across the front of the forging machine, is a complementary upstanding crank arm 113 also pivotally connected to the link 111. At the right end of the rock shaft 112 (as viewed in FIGS. 1 and 2) is a longer upstanding crank arm 114 that pivotally connects to a generally horizontal link 116 pivoted to the pusher carriage 42. Thus as counter shaft 27c is rotated by the crankshaft of the forging machine, the crank 110 produces oscillating type rotation to the rocker shaft 112 and this movement is in turn transmitted to the pusher carriage as reciprocating motion along rail 44. Here again, the movement of the pusher is synchronized with the operation of the forging machine and the rest of the transfer and feed apparatus so that the pusher moves forward to engage the end of the blank in the top row of transfer wheels 38 soon after a new blank B drops into that position, and the blank is slid through the dies and against the stock gauge 19. It can be seen that the pusher completes one reciprocation for each turn of the crankshaft 7. Since the conveyor 52 moves continuously and need not be synchronized with the forging machine so long as it moves fast enough to clear the blanks, referring to FIGS. 1, 7 and 12 and 13, a separate motor driven gear reduction drive D (FIG. 12) is provided for the conveyor chain. To insure that the upper reach of the chain remains flat as the bolts are conveyed, a fixed rail 130 supports the rollers 131 of the chain (see FIG. 13). The drive unit D has a drive sprocket 132 driving a chain 133 and driver sprocket 134 is keyed to the outer end conveyor sprocket 135 which drives the chain. The other end of the chain extends over a smilar sprocket 136 (FIG. 7) within the forging machine. Side rails 137 prevent the bolts from falling off the chain before they reach the sweeper mechanism S.

At the blank distributing unit S, as previously mentioned, the sweeper bar 56 swings across the chain only when a finished bolt is properly located in the sweeper unit S by the conveyor chain 52. As best seen in FIGS. 12 and 13, the sweeper bar 56 is mounted on depending arms 140 keyed to a rock shaft 141 supported by longitudinally spaced brackets 144. In order to swing the sweeper bar from side to side, a crank arm 146 extends laterally from the forward end of shaft 141 (to the right in FIG. 13) and is connected to the piston 147 sliding in an air cylinder 148, pivotally mounted on the frame at 149. Therefore, as the piston 147 is raised, as the unit is viewed in FIG. 13, the sweeper bar 56 moves to the right, and when the piston 136 moves down the sweeper bar moves to the left.

Referring to the control circuit diagram of FIG. 15 and to FIG. 14, the microswitch 54 at the conveyor is closed each time the head of a finished bolt $B_4$ engages the trigger 53. This closes the microswitch contacts 150 and line current now passes through a pair of contacts 151 (now closed) in a sequence switch 152 to energize a solenoid 153 in a four-way solenoid valve 154 that shifts the valve to admit air beneath piston 147 from supply line 156 and to exhaust air above the piston through exhaust port 157.

The sweeper bar 56 now swings across the chain and clears the bolt $B_4$ from the chain and, at the same time, a control arm 158 (best seen at the extreme right of FIG. 12 and in FIG. 14) that is connected to the same rock shaft 14 swings with the sweeper bar arms 140. Control arm 158 terminates in a cross bar 159 having laterally spaced lugs 161. These lugs alternately engage and swing an over-center switch contact arm 162, extending from the sequence switch 152 to open and close contacts 151, previously referred to, alternately with an opposed set of contacts 163 in the sequence switch by a contactor 164 within the switch body (FIG. 15).

For example, in the arrangement diagrammed in FIG. 15, the head 165 of a bolt $B_4$ is about to pass under trigger plate 53 of microswitch 54, and the portion of the contact arm 162, that extends down from sequence switch 152, is to the left, as is the sweeper and the control arm 158. Thus the sequence switch has been shifted or moved to set up the control circuit for solenoid valve 154 so that when contacts 150 are closed by the bolt head, the solenoid for valve 154 that admits air beneath piston 147 and swings the sweeper bar and arm 158 to the right is the solenoid that is engaged, thereby clearing the bolt from the conveyor, and opening contacts 150. By this time, however, overcenter switch arm 162 has been clicked over to its right position (moving the contact portion of the arm 164 to the left in FIG. 15) by the left hand lug 161 of the control arm 158, thereby setting up the circuit to the other solenoid in valve 154, which is the solenoid arranged to shift the air valve for moving the sweeper bar to the left when the microswitch is closed by the head of the next bolt. Thus it can be seen that the sweeper bar moves across the conveyor chain 52 only when a bolt is properly positioned adjacent thereto and operates to sweep successive bolts off opposite sides of the conveyor chain. Switches such as microswitch 54 and over-center or snap sequence switch 152, and solenoid operated valves such as 154 are well known items of commerce in the control art, and design details thereof are accordingly omitted in the interest of conciseness.

Those skilled in the art will recognize that a machine incorporating this invention automatically operates to feed long blanks to the forging machine and sequentially moves the blanks through the various stations of the forging operation after which the completed piece is conveyed out of the machine to a packaging position. Therefore, high speed operation can be achieved in a completely automatic manner without danger of jamming at the forging machine dies. It should be understood that the maximum permissible blank length is determined by the length of the blank handling units F and W and the length of the pusher drive link 116. The number of transfer wheel shafts required depends upon the number of forging stations, but the drive itself is not complicated by increasing the number of transfer wheels in unit W or by changing the length of the unit. Because the transfer wheels operate to move the blanks through a generally semi-circular path between the adjacent die stations, it is possible to utilize transfer tong structure of the type shown which also operates to move the blanks through a substantially semi-circular path. It should be understood that even if the paths may not exactly coincide, so long as the units are properly timed, this will not create difficulty since the blanks are only loosely supported by the transfer wheels and cannot "droop" or sag enough to cause trouble.

The "Resume of Operation" that follows, taken in conjunction with the timing diagram of FIG. 16 and the tong and transfer wheel motion diagrams of FIGS. 16A and 16B, will supplement and explain the highly schematic diagram of FIG. 2, the latter having been presented primarily to show the interrelationship of the various driving and driven elements.

Resume of operation (1) The right and left tongs are closed and in their down position at fixed die, as seen in FIG. 3b. The grip die is closing on the blanks. The stock separator has moved up to release a new blank into the upper blank relieving notches in the upper row of transfer wheels, which are now stationary.

(2) The header slide advances and the tools engage the blanks that are gripped in the dies. The tongs now open up laterally to clear the die-gripped blanks and release and drop the previously finished blank $B_4$, positioned in the open notches 28.

(3) Shortly after tongs start to open, they start to rise. While the tongs are open and rising, the grip dies remain closed on the blanks and the heading slide completes its operations. While the tongs are rising and open, and the grip die is closed, the pusher is advancing the forward end of the new blank through the open tongs and into the upper blank receiving recess formed in the forging machine dies.

(4) The tongs reach their uppermost position (still open) as seen in FIG. 3c, and the new blank has been fed by the pusher through the tongs against the stock gauge. The blank feed separator has returned to its lower position ready to receive and hence to lift a new blank into the feed trough leading to the notched transfer wheels. The header slide is now retracting but the dies remain closed long enough for the punches or tools on the header slide to be freed from the blanks.

(5) The tongs, now in their upper position, close on the new blank and on the blanks in forging stations of the dies.

(6) The grip die opens, the blanks being held by both the tongs and the transfer wheels. The pusher is now retracting.

(7) Both tongs move to the left or away from the fixed die, as seen in FIG. 3a, carrying all of the blanks clear of the impressions in the fixed die. The stock feed separator is now moving up to lift a new blank for release into the feed trough.

(8) The tongs, closed on the blanks, move first left and down and then right and down to their lowermost position and simultaneously the transfer wheels are given a ½ turn by the Geneva drive to effect a corresponding motion of the blanks. The new blank B is aligned with the first gripping station 15 and the finished blank $B_4$, still gripped by the tongs, is placed in the notches 28, while the trailing end of this blank is dropped by the transfer wheels onto the conveyor.

(9) Back to step 1, the grip die closes and the cycle repeats itself.

Although a preferred embodiment of this invention has been described and illustrated, it will be realized that various modifications of the described embodiment may be made without departing from the mode of operation and the essence of the invention. Accordingly, the appended claims and not the aforesaid detailed descriptions are determinative of the scope of the invention.

I claim:

1. In combination with a forging machine having a tool-carrying header slide and a releasable die assembly formed with a plurality of spaced blank receiving die stations, and drive means for said header slide and die assembly, the improvement which comprises the combination of blank carrying means adjacent to said die stations at the side of the die assembly away from said slide for progressively shifting a blank from die station to die station, a blank transfer mechanism having a plurality of rotary transfer means spaced away from said die assembly at said side thereof for supporting blanks along the blank axis and in line with respective die stations, said blank transfer mechanism being intermittently rotatable to progressively shift blanks from transfer means to transfer means along a path similar to that imparted to the blanks by said blank carrying means, blank feed means to slide the blank along the transfer means aligned with the first station, along said blank carrying means and into said first station, means to drive said blank carrying and blank feed means in synchronization with said forging machine header slide and die assembly, and means to drive said transfer means in synchronization with the operation of said blank carrying means.

2. In combination with a forging machine having a tool-carrying header slide and a releasable die assembly formed with a plurality of spaced blank receiving die stations, and drive means for said header slide and die assembly, the improvement which comprises the combination of transfer tongs adjacent to said die stations at the side of the die assembly away from the slide, tong operating means for opening and closing said tongs and for moving said tongs by the distance between adjacent die stations for progressively shifting a blank from station to station, a blank transfer mechanism having a plurality of blank transfer means spaced away from the die assembly at said one side thereof for supporting blanks along their respective lengths away from the die assembly and in line with the respective die stations, said transfer means being movable to progressively shift blanks from transfer means to transfer means along a path similar to that imparted to the blanks by said tongs, blank feed means to slide the blank along the transfer means aligned with the first station, between said tongs and into said first station, means to drive said tong operating means and said blank feed means in synchronization with said forging machine header slide and die assembly, and means to drive said transfer means in synchronization with the operation of said transfer tongs.

3. In combination with a forging machine having a tool-carrying header slide and a releasable die assembly formed with a plurality of spaced blank receiving stations, and drive means for said header slide and die assembly, the improvement which comprises the combination of blank carrying means adjacent to said die stations at the side of the die assembly away from the slide for progressively shifting a blank from die station to die station, a blank transfer mechanism having a plurality of rows of notched transfer wheels located away from the die assembly at said one side thereof for supporting blanks along the blank axis, with each row in line with one of said die stations, intermittent drive means for said notched wheels to progressively shift blanks along a path similar to that imparted to the blanks by said blank carrying means, blank feed means to slide the blank along the transfer wheels aligned with the first station and into said first station, means to drive said blank carrying and blank feed means in synchronization with said forging machine header slide and die assembly, and means to drive said intermittent drive means in synchronization with the operation of said blank carrying means.

4. In combination with a forging machine having a tool-carrying header slide and a releasable die assembly formed with a plurality of vertically spaced blank receiving stations, and drive means for said header slide and die assembly, the improvement which comprises the combination of blank carrying means adjacent to said die stations at the side of the die assembly away from the slide for progressively shifting a blank from station to station, a blank transfer mechanism having transfer means located away from the die assembly at said one side thereof for supporting blanks along the blank axis and in line with said die stations, said transfer means being movable to progressively shift blanks along a path similar to that imparted to the blanks by said blank carrying means, blank feed means to slide the blank along the transfer means aligned with the first station and into said first station, means to drive said blank carrying and blank feed means in synchronization with said forging machine header slide and die assembly, means to drive said transfer means in synchronization with the operation of said blank carrying means, and completed blank receiving and conveyor means extending from beneath the lowermost blank receiving station and said transfer means in a direction opposite to that imparted to the blanks by said blank feed means.

5. In combination with a forging machine having a tool-carrying header slide and a releasable die assembly formed with a plurality of vertically spaced blank receiving stations, and drive means for said header slide and die assembly, the improvement which comprises the combination of blank carrying means adjacent to said die stations at the side of the die assembly away from the slide for progressively shifting a blank from station to station, a blank transfer mechanism having transfer means located away from the die assembly at said one side thereof for supporting blanks along the blank axis and in line with said die stations, said transfer means being movable to progressively shift blanks along a path similar to that imparted to the blanks by said blank carrying means, blank feed means to slide the blank along the transfer means aligned with the first station and into said first station, means to drive said blank carrying and blank feed means in synchronization with said forging machine header slide and die assembly, means to drive said transfer means in synchronization with the operation of said blank carrying means, completed blank receiving and conveyor means extending from beneath the lowermost blank receiving station and said transfer means in a direction opposite to that imparted to the blanks by said blank feed means, and completed blank distributing means adjacent said transfer mechanism including a blank sweeper, and means for moving said sweeper across said conveyor means to discharge blanks from the conveyor means.

6. In combination with a forging machine having a tool-carrying header slide and a releasable die assembly formed with a plurality of vertically spaced blank receiving stations, and drive means for said header slide and die assembly, the improvement which comprises the combination of transfer tongs adjacent to said die stations at the side of the die assembly away from said slide, tong operating means for opening and closing said tongs and for moving said tongs up and down by the distance between adjacent stations for progressively shifting a blank from die station to die station, a blank transfer mechanism having transfer means located away from said die assembly at said side thereof for supporting blanks along their respective lengths away from said die assembly and in line with each of said die stations, said transfer means including a plurality of notched discs, each disc having notches alignable with adjacent blank receiving stations, means to rotate said discs intermittently to progressively shift blanks from station to station along a path similar to that imparted to the blanks by said tongs, blank feed means to slide the blank resting in the upper notches of the transfer discs aligned with the first station into said first station, means to drive said tong operating means and said blank feed means in synchronization with said forging machine header slide and die assembly, and means to drive said transfer means in synchronization with the operation of said transfer tongs.

7. In combination with a forging machine having a tool-carrying header slide and a releasable die assembly formed with a plurality of vertically spaced blank receiving stations, and drive means for said header slide and die assembly, the improvement which comprises the combination of transfer tongs adjacent to said die stations at the side of the die assembly away from said slide, tong operating means for opening and closing said tongs and for moving said tongs up and down by the distance between adjacent stations for progressively shifting a blank from die station to die station, a blank transfer mechanism having transfer means located away from said die assembly at said side thereof for supporting blanks along their respective lengths away from said die assembly and in line with each of said die stations, said transfer means including a plurality of notched discs, each disc having notches alignable with adjacent blank receiving stations, means to rotate said discs intermittently to progressively shift blanks from station to station along a path similar to that imparted to the blanks by said tongs, blank feed means to slide the blank resting in the upper notches of the transfer discs aligned with the first station and into said first station, means to drive said tong operating means and said blank feed means in synchronization with said forging machine header slide and die assembly, means to drive said transfer means in synchronization with the operation of said transfer tongs, and an endless conveyor running from beneath said die stations and said transfer mechanism to a blank distributing station adjacent said transfer mechanism.

8. In a metal working apparatus comprising a frame, a set of equally spaced dies in said frame, and tools for operating on blanks in said dies, the improvement which comprises the combination of means for transferring blanks from die to die comprising a pair of blank gripping tongs in front of said dies arranged to move blanks from die to die, and a complementary set of transfer means in front of said tongs and away from said frame for moving blanks in a path corresponding to that of said tongs when the latter are carrying blanks, means for synchronizing the motion of said tongs with that of said tools, and means for synchronizing the motion of said tongs and said blank transfer means to advance blanks between the dies, said blank transfer means comprising blank supporting means movably mounted at the front of each die beyond said tongs, and means to move said blank supporting means intermittently to transfer blanks from one transfer means to adjacent transfer means.

9. In a metal working apparatus comprising a frame, a set of die stations mounted in said frame, including a blank feed die station, and tools for operating on blanks in said die stations, the improvement which comprises the combination of means for transferring blanks from die station to die station comprising blank gripping and releasing members in front of said die stations arranged to move blanks from die station to die station, a complementary set of blank supporting transfer means in front of said blank gripping and releasing members and aligned with each die station for moving blanks from transfer means to adjacent transfer means in a path corresponding to that of said blank gripping and releasing members when the latter are carrying blanks, blank feed means for sliding blanks along said blank transfer means, through said blank gripping and releasing members and into said blank feed die station, means for synchronizing the motion of said blank gripping and releasing members with that of said tools, and means for synchronizing the motion of said blank gripping and releasing members and said blank transfer means to advance blanks between the die stations.

10. In combination, a forging machine having a load position and a plurality of die stations, transfer tongs adjacent said die stations operable to move blanks from said load position and progressively to each of said die stations, a hopper containing elongated blanks, means to feed single blanks from said hopper in alignment with said load position, pusher means operable to axially slide the fed blank into said load position, transfer means supporting said blanks at spaced points along their axes operable to sequentially move blanks from said load position to positions aligned with said die stations, said transfer means including a plurality of rows of transfer wheels each having recesses in which blanks are positioned, and intermittent drive means operable to rotate said wheels and progressively move blanks to adjacent rows of transfer wheels at the same time said transfer tongs move blanks between said die stations.

11. In combination, a forging machine having a load position and a plurality of die stations, transfer tongs adjacent said die stations operable to move blanks from said load position and progressively to each of said die stations, a hopper containing elongated blanks, means to feed single blanks from said hopper in alignment with said load position, pusher means operable to axially slide the fed blank into said load position, transfer means supporting said blanks at spaced points along their axes operable to sequentially move blanks from said load position to positions aligned with said die stations, said transfer means including a plurality of rows of transfer wheels each having recesses in which blanks are positioned, intermittent drive means operable to rotate said wheels and progressively move blanks to adjacent rows of transfer wheels at the same time said transfer tongs move blanks between said die stations, and conveyor means transporting each blank away from said forging machine and transfer means after the blank has moved into and out of each die station.

12. Mechanism for supplying elongated blanks to a multi-station metal working machine comprising a hopper for the blanks, blank separating means at said hopper operable to release single blanks from said hopper, first blank transfer means beneath said hopper to receive a blank and support it in the load position at spaced points along the blank axis, second blank transfer means adjacent said first blank transfer means for supporting a blank in alignment with a machine station adjacent to the first station, means to drive said first and second transfer means to sequentially move blanks from said load position to said second blank transfer means, and to move the blank in said second transfer means out of said second transfer means, said first and second transfer means each including a plurality of rows of transfer wheels having recesses for receiving the blanks, and drive means operable to intermittently rotate said wheels one half turn to progressively transfer the blanks.

13. Mechanism for supporting the free ends of elongated blanks while the blanks are gripped in spaced stations of a metal working machine and for intermittently and simultaneously transferring each blank from station to station, said mechanism comprising a plurality of shafts, each with an axis parallel to the axis of an associated machine station, a plurality of blank transfer members on each shaft, opposed blank receiving notches in each transfer member arranged to be placed alternately in alignment with adjacent associated machine stations, and means for intermittently rotating said shafts for one half turn to transfer blanks from a notch in one transfer member to a notch in an adjacent transfer member thereby transferring blanks from station to station.

14. Mechanism for supporting the free ends of elongated blanks while the blanks are gripped in spaced stations of a metal working machine and for intermittently and simultaneously transferring each blank from station to station, said mechanism comprising a plurality of shafts, each with an axis parallel to the axis of an associated machine station, a set of blank transfer members mounted in axially spaced relation on each shaft, opposed blank receiving notches in each transfer member arranged to be placed alternately in alignment with adjacent associated machine stations, and means for intermittently rotating said shafts for one half turn to transfer blanks from each set of transfer members to an adjacent set to thereby transfer blanks from station to station.

15. A blank handling mechanism for a metal working machine comprising a hopper containing elongated blanks, fingers on said hopper operable to feed single blanks from said hopper to a load position, pusher means operable to axially position a blank in said load position, and transfer means supporting said blanks at spaced points along their axes operable to sequentially move blanks from said load position to working positions spaced from and parallel to said load position, said transfer means including a plurality of rows of transfer wheels having circumferentially spaced recesses in which blanks are positioned and intermittent drive means operable to intermittently rotate said wheels by the circumferential spacing of said notches to thereby move blanks from each row to an adjacent row of transfer wheels.

16. A transfer mechanism for moving elongated blanks progressively between a plurality of spaced and parallel horizontal positions comprising a rotary horizontal shaft for each position on which are mounted axially spaced transfer wheels in a row, each of said wheels being formed with diametrically opposite recesses adapted to receive a blank and move the blank contained therein upon rotation of said shafts and wheels, means to drive said shafts intermittently in the same direction through one-half turn to position one recess in each wheel facing upwardly to receive a blank near the completion of one-half turn and then to position the opposite recess in each wheel facing upwardly to receive a blank near the completion of the next half turn, and deflector fingers positioned to transfer blanks from the blank-receiving recesses of one row of transfer wheels to those of the adjacent row near the completion of one half turn of said shaft and wheels.

17. A transfer mechanism for moving elongated blanks progressively between a plurality of spaced and parallel positions comprising a shaft for each position on which are mounted axially spaced transfer wheels in a row, each of said wheels being formed with diametrically opposite recesses adapted to receive a blank and move the blank contained therein upon rotation of said shafts and wheels, deflector fingers positioned to transfer blanks from the recesses of one row of transfer wheels to those of the adjacent row near completion of one half turn of said shaft and wheels, means to drive said shafts intermittently in the same direction through one half turn, means to feed single blanks to the first row of transfer wheels, and means to drive said feed means intermittently in synchronization with said transfer wheel shafts.

18. In combination, a forging machine having a load position and a plurality of die stations, transfer tongs adjacent said die stations operable to move blanks from said load position and progressively to each of said die stations, a hopper containing elongated blanks, fingers on said hopper operable to feed single blanks from said hopper into alignment with said load position, pusher means operable to axially position a blank into said load position in the machine, transfer means supporting said blanks at spaced points along their axes operable to sequentially move blanks from said load position to positions aligned with said die stations, and intermittent drive means operating said transfer means to progressively move blanks to adjacent die stations at the same time said transfer tongs move blanks between said die stations.

19. In combination, a forging machine having a load position and a plurality of die stations, transfer tongs adjacent said die stations operable to move blanks from said load position and progressively to each of said die stations, pusher means operable to axially slide a blank into said load position in the machine, transfer means supporting said blanks at spaced points along their axes operable to sequentially move blanks from said load position to positions aligned with said die stations, intermittent drive means operating said transfer means to progressively move blanks to adjacent die stations at the same time said transfer tongs move blanks between said die station, a conveyor leading from said die stations and beneath said transfer means to a blank distributing station, and blank clearing means at said blank distributing station for pushing blanks laterally off one side of said conveyor.

20. The apparatus of claim 19 wherein said blank clearing means includes means to move it alternately in opposite directions across said conveyor.

References Cited in the file of this patent

UNITED STATES PATENTS

| | | |
|---|---|---|
| 1,047,288 | Radack | Dec. 17, 1912 |
| 1,365,073 | Allerton | Jan. 11, 1921 |
| 1,916,608 | Ehinger | July 4, 1933 |
| 2,856,802 | Hercik | Oct. 21, 1958 |
| 2,881,950 | Friedman | Apr. 14, 1959 |